United States Patent Office 3,541,292
Patented Nov. 17, 1970

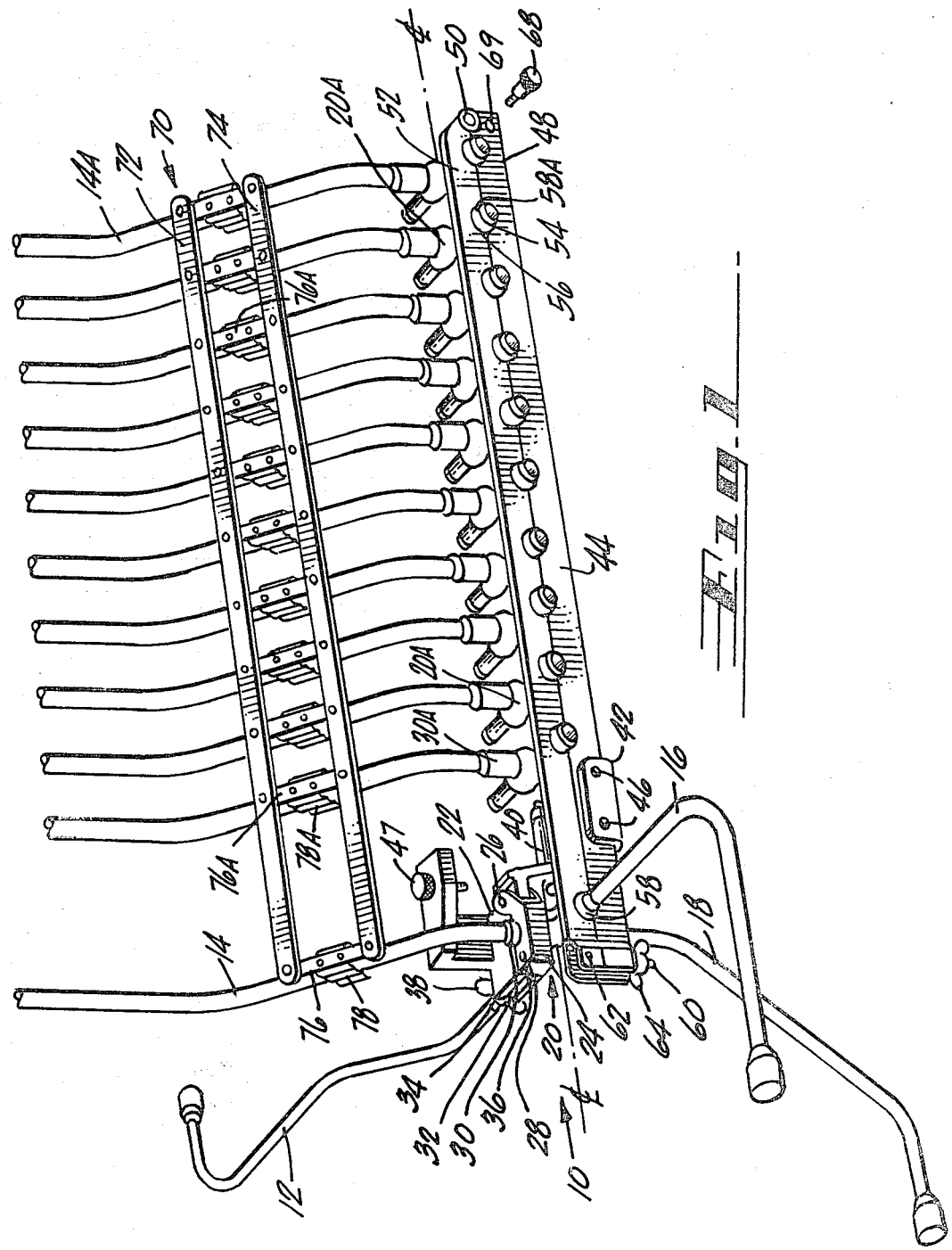

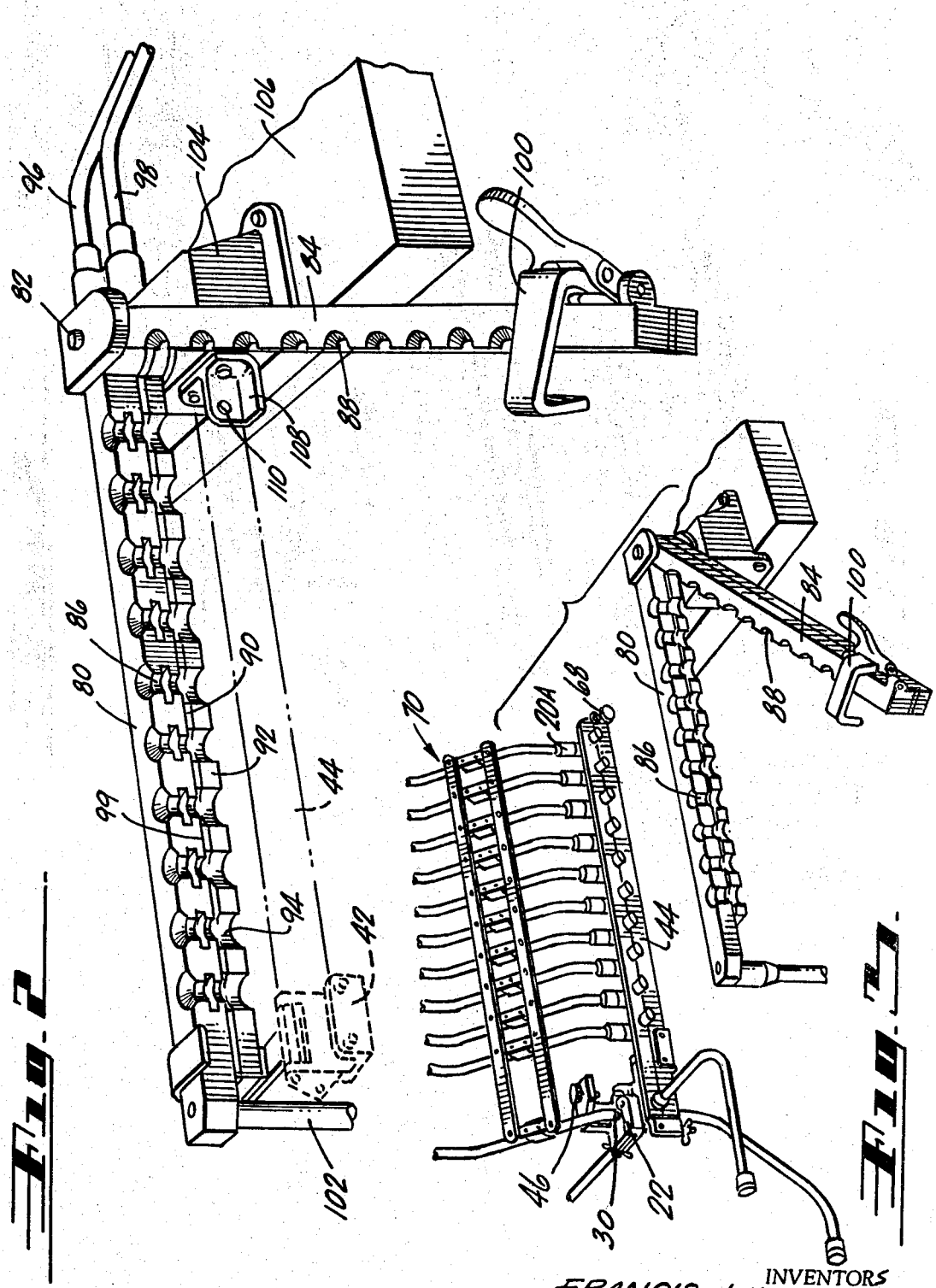

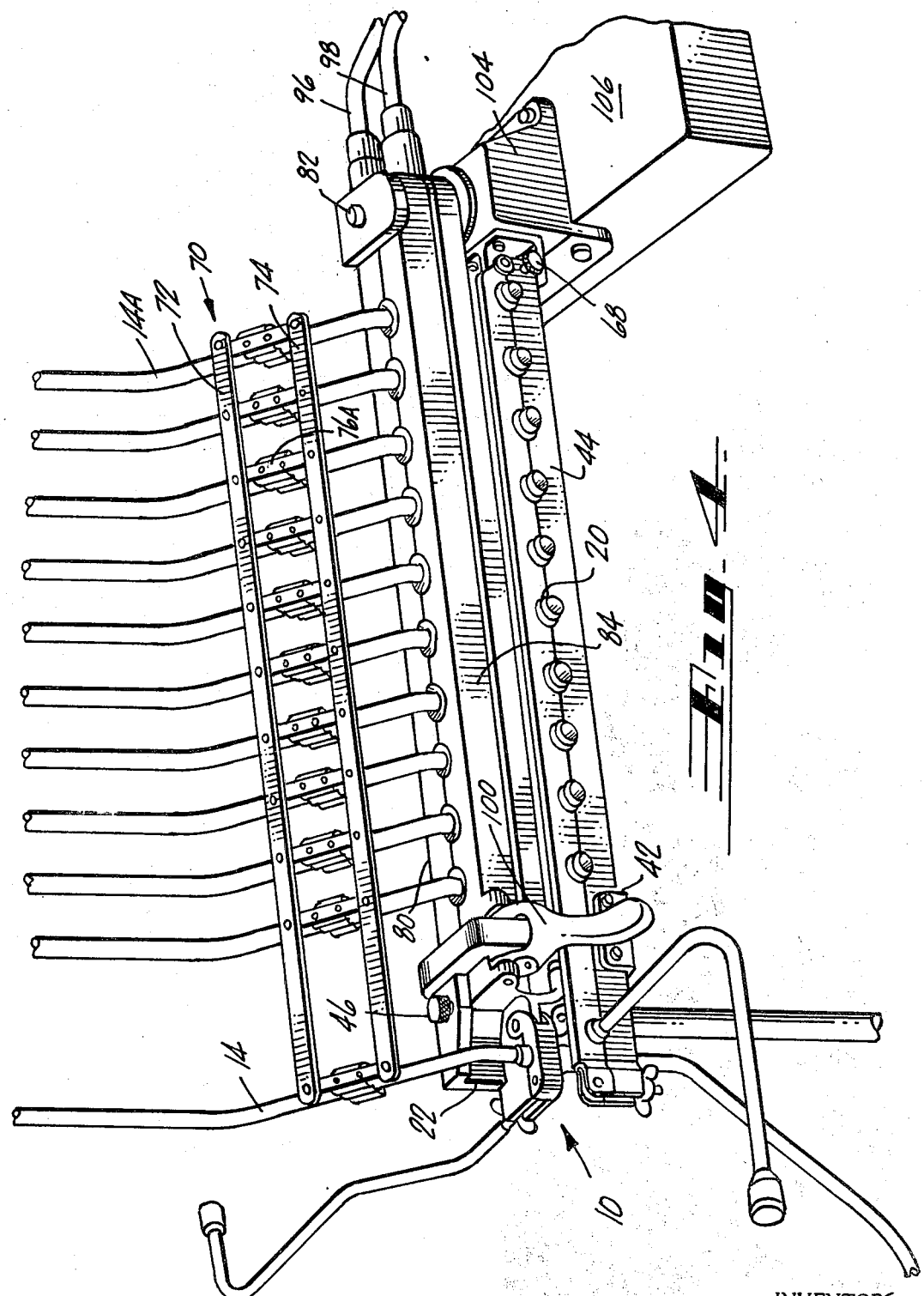

3,541,292
APPARATUS FOR MAKING MULTIPLE BRAZED TUBE ASSEMBLIES
Francis J. Hanback, Palos Verdes, and Norman F. Robinson, Manhattan Beach, Calif., assignors to McDonnell Douglas Corporation, Santa Monica, Calif., a corporation of Maryland
Filed Feb. 4, 1969, Ser. No. 796,409
Int. Cl. B23k 1/04
U.S. Cl. 219—85         6 Claims

ABSTRACT OF THE DISCLOSURE

A multiple station brazing tool and associated apparatus to facilitate the production of brazed tube connections, capable of brazing several subassembly connections at once. Inert gas shields, RF energy and chill block sections are used as in co-pending applications.

CROSS REFERENCES TO RELATED APPLICATIONS

This application relates to apparatus for use with the subject matter structure of co-pending patent application, S.N. 655,500, filed July 24, 1967 for Multiple Station Brazing Device and reference is made to the information therein as though fully set forth hereinbelow.

BACKGROUND OF THE INVENTION

This invention relates to apparatus for the simultaneous brazing of tubes and associated coupling and connectors, as subassemblies prior to final installation. In the copending application referred to above there is shown a multiple brazing tool in which the principles of another co-pending application, Pat. No. 3,428,769 for Induction Heating Tool have been utilized. The present problem occurred wherein a multiple of identical complex brazed assemblies must be used. Accordingly, appropriate jigs and holding devices are necessary to position a multiple of complex tubing segments and fittings so that a number of assemblies may be brazed identically, accurately and simultaneously.

DESCRIPTION OF THE DRAWING

FIG. 1 is a perspective view showing identical tube segments and aligned fittings, together with a master part, prior to brazing in a multiple cavity tool;

FIG. 2 shows a multiple cavity tool shown, described, and claimed in the co-pending application, S.N. 655,500, but with additional mounting brackets added;

FIG. 3 is a perspective view showing the relationship of the structure in FIG. 1 and FIG. 2 prior to final assembly for brazing; and FIG. 4 is a perspective view showing the assemblies finally positioned and ready for the brazing operation.

DESCRIPTION OF ILLUSTRATIVE EMBODIMENT

Reference is now made to FIG. 1 wherein there is shown a master assembly 10 for which duplicate assemblies are to be made. This master assembly consists of four tubes 12, 14, 16 and 18, all terminating into and brazed with an interconnecting fitting 20. For purposes of illustration, the brazed connection between tube 14 and fitting 20 will be duplicated on a plurality of identical assemblies in which tubes 14A and fittings 20A are the components to be brazed. From this illustration it will be readily apparent that other configurations of tubes and fittings may be brazed in a similar manner.

A master part holding bracket 22 is provided which has a clamp, portion 24 pivotally mounted at pivot 26 and has a cut-out portion 28 to receive the upper neck 30 of fitting 20. Bracket 22 has a lateral groove 32 at its outer end to receive bolt 34 which is pivotally mounted at 36 to clamp 24. A wing nut 38 fits over the end of bolt 34 and is used to tighten clamp 24 securely against the upper neck 30 of fitting 20. Bracket 22 is hingedly mounted at 40 to hinge support 42 which, in turn, is secured to the lower portion of the fitting alignment rack 44 by screws 46. Bracket 22 also has a quick attachment member such as a knurled thumb screw 47 by means of which it may be mounted to the brazing fixture, as will be shown in FIG. 4.

Fitting alignment rack 44 consists of a lower U-shaped channel 48 pivotally connected at 50 to an upper U-shaped channel 52. Each of the channels has corresponding cut-out portions 54, 56, to receive end 58A of fitting 20A whereby a plurality of such fittings may be held in alignment. At the left end in FIG. 1, upper channel 52 has a bolt 60 pivotally mounted at 62. This bolt extends between the channels of lower channel 48 and wing nut 64 is tightened thereon to thus cause channels 48 and 52 to be tightened over ends 56A of fittings 20A and maintain them in aligned relationship. At the right end in FIG. 1, a quick attachment member such as thumb screw 68 is adapted to pass through aperture 69 in lower channel 48 to fasten it to the bracket as can be seen in FIG. 4.

A plurality of tubes 14A, which are identical to tube 14 in the master assembly, fit into the upper ends 30A of fittings 20A and are held in proper orientation by tube alignment rack 70. This rack consists of a pair of parallel bars 72, 74 with a plurality of pivotal parallel connectors 76A. Each of these connectors 76A has U-shaped spring-like clips 78A mounted thereon and adapted to engage tubes 14A. One such connector 76 with clip 78 engages master assembly tube 14 and serves to align bars 72 and 74 to thus orient tubes 14A to correspond with master tube 14 before the tubes 14A are brazed to their respective fittings 20A.

Reference is now made to FIG. 2 which shows a multiple brazing tool, the principle of which is shown and described in co-pending application, S.N. 655,500, filed July 24, 1967 for Multiple Station Brazing Device. This device consists of a first half 80 to which is pivotally mounted at pivot 82, a second half 84. Each half is similarly constructed with the upper portion of half 80 having a recess 86 to accommodate half a tube and the corresponding recess 88 on section 84 to accommodate the other half when the two are in abutting relationship. A layer of insulation 90 separates the top portion from the lower portion 92 wherein a plurality of half-circle cavities 94 are provided. A gas line 96 and electrical line 98 are connected to the brazing device to provde the necessary purging gas and electrical energy for brazing. Over the center clamp 100 is provided at the outer end of 84 for engagement with the outer end of 80. After the brazing device is closed over the tubes and fittings to be brazed the device is supported on a floor extending leg 102 and a mounting bracket 104 mounted at the edge of a work bench 106. Fastened to the support bracket 104 is a fitting attachment rack support bracket 108 having an aperture therein 110 adapted to receive thumb screw 68 in FIG. 1 in the attachment of the fitting alignment rack. The position of the fitting alignment rack 44 is shown in phantom lines as is the assembly rack hinged support 42.

Reference is now made to FIG. 3 which shows the assemblies properly positioned and retained by the tube alignment rack 70, fitting alignment rack 44, master part holding bracket 22. The pivotal half 84 of the brazing unit is opened to permit the insertion of the top portion 30 of fittings 20A to be received within the half cavities 86 of the stationary half 80 of the brazing tool and corresponding half cavities 88 after which the pivotal half 84 may be closed and locked in position by the over-the-center latch 100.

In FIG. 4 there is shown the assemblies positioned by the alignment racks and in position within the brazing tool for the brazing operation. The fitting and alignment rack has been mounted to bracket 104 on bench 106 by thumb screw 68 and assembly rack hinged support 42 connects the alignment rack with the master part holding bracket 22 which, in turn, is fastened to the brazing tool half 80 by thumb screw 46, tube alignment rack 70 has positioned the tubes 14A to correspond with the tube 14 on the master assembly 10. It should be noted that the fitting alignment rack 44 extends below the path of pivotal movement of brazing tool half 84 which has been locked in the closed position by the over-center latch 100. While in this position, the upper deck of the fittings 20 are brazed to the lower ends of the tubes 14A. Typically, the heating and cooling cycle in the brazing operation is 30 seconds which thus averages three seconds per brazed joint for a production rate of approximately 300 joints per hour. The movable portion 84 of the brazing device may be unlatched and pivoted to permit visual inspection of the brazed joints before the assemblies are removed. After the brazing operation, the alignment racks and the master part holding clamps may be removed from the brazing tool by loosening thumb screws 46 and 68. By using helpers to load and unload the alignment fixtures with tubes and fittings and by using similar sets of alignment racks the brazing tool may be kept in constant operation on a mass production basis. The use of individual holding fixtures is eliminated which reduces greatly the cost of tooling, alone. In considering the use of over 200 complex brazed assemblies similar to the one shown in one airplane, there is also a very substantial saving in labor.

Having thus described the procedure for the brazing of one joint in a complex assembly, it will readily become apparent that the racks and brackets comprising the present invention may be used in the brazing of assemblies of multiple configurations and that the fittings may be simple or multiple fittings.

Having thus described an illustrative embodiment of this invention, it will become apparent that there are modications and improvements that may be made and that these obvious variations are to be considered as part of the present invention.

We claim:

1. Apparatus for making multiple brazed tube assemblies comprising:
   a multiple brazing tool,
   a master tube assembly of tubes and fittings of the configuration sought to be duplicated,
   a master assembly holding bracket for positioning said assembly relative to said multiple brazing tool,
   a fitting alignment rack fastened to said brazing tool for holding a plurality of fittings thereto, said fitting alignment rack having said holding bracket affixed thereto, and
   a tube alignment rack attachable to one of said tubes in said master tube assembly and comprising means for thus orieting a plurality of tubes in corresponding position to be brazed with said fittings.

2. Apparatus for making multiple brazed tube assemblies as in claim 1 wherein said master assembly holding bracket is pivotally mounted to said fitting alignment rack for selected positioning relative thereto.

3. Apparatus for making multiple brazed tube assemblies as in claim 1, wherein said fitting alignment rack and said tube alignment rack are positioned on opposite sides of said brazing tool.

4. Apparatus for making multiple brazed tube assemblies as in claim 1 wherein said fitting alignment rack has pivotally mounted members clamped around fittings held thereby, said members being clamped together to hold said fittings.

5. Apparatus for making multiple brazed tube assemblies as in claim 1 wherein said bracket has a clamp pivotally attached thereto to hold a fitting therebetween.

6. Apparatus for making multiple brazed tube assemblies as in claim 1 wherein said master assembly bracket is fastened to said brazing tool.

References Cited

UNITED STATES PATENTS

| | | | |
|---|---|---|---|
| 2,402,508 | 6/1946 | Strickland | 219—10.67 |
| 2,404,987 | 7/1946 | Rudd | 219—10.67 X |
| 2,484,238 | 10/1946 | Molloy | 219—10.67 |
| 2,784,285 | 3/1957 | Brauer et al. | 219—10.67 |
| 3,428,769 | 2/1969 | Ciszewski et al. | 219—9.5 |

JOSEPH V. TRUHE, Primary Examiner

L. A. SCHUTZMAN, Assistant Examiner

U.S. Cl. X.R.

219—158; 161